United States Patent [19]

McEowen et al.

[11] 4,196,316
[45] Apr. 1, 1980

[54] PROGRAM CONTROLLED COMMUNICATION SYSTEM HAVING INDIVIDUALLY REARRANGEABLE LINE SELECTION

[75] Inventors: James R. McEowen; Robert M. Smith, both of Holmdel; Tse L. Wang, Matawan, all of N.J.

[73] Assignee: Bell Telephone Laboratories, Incorporated, Murray Hill, N.J.

[21] Appl. No.: 943,524

[22] Filed: Sep. 18, 1978

Related U.S. Application Data

[63] Continuation-in-part of Ser. No. 832,888, Sep. 13, 1977, abandoned.

[51] Int. Cl.² .................... H04M 3/42; H04Q 3/54
[52] U.S. Cl. ................... 179/18 ES; 179/18 AD; 179/18 B; 179/99 R
[58] Field of Search .............. 179/18 B, 18 AD, 99, 179/90 BD, 81 R, 1 H, 2 A, 18 BE, 18 D, 18 BA, 27 FH, 15 AL, 15 BA, 18 ES

[56] References Cited

U.S. PATENT DOCUMENTS

| | | | |
|---|---|---|---|
| 3,385,935 | 5/1968 | Anderson et al. | 179/99 |
| 3,436,488 | 4/1969 | Barbato et al. | 179/99 |
| 3,519,757 | 7/1970 | Anderson et al. | 179/18 J |
| 3,549,820 | 12/1970 | Knollman | 179/99 |
| 3,555,201 | 1/1971 | Kuehnle et al. | 179/90 BD |
| 3,588,365 | 6/1971 | McNeilly et al. | 179/81 R X |
| 3,660,611 | 5/1972 | Knollman et al. | 179/18 ES |
| 3,701,855 | 10/1972 | Reynolds | 179/18 ES |
| 3,757,053 | 9/1973 | Pell et al. | 179/18 J |
| 3,843,845 | 10/1974 | Ridley | 179/99 |
| 3,935,396 | 1/1976 | Barsellotti et al. | 179/99 |
| 3,973,085 | 8/1976 | Shiff | 179/99 |
| 4,112,261 | 9/1978 | Shiff | 179/99 |

Primary Examiner—Thomas W. Brown
Attorney, Agent, or Firm—David H. Tannenbaum

[57] ABSTRACT

A small program controlled communication system is disclosed having user changeable feature and line selection control. Associated with each station is a set of switches which are used to associate the various central office lines with the available nonlocking station pickup keys. The user, by setting the switches, can establish any line as a prime line and may select which other lines appear at the station. The setting of the switches also controls various other features available to the station, such as common audible, and privacy. The system is arranged such that the processor interrogates the switches periodically and translates the setting of the switches, which are human factors coded, into machine control codes which are stored in the main memory.

8 Claims, 19 Drawing Figures

FIG. 1

FIG. 4
SWITCH FIELD 30
(PART OF STATION CCT 10-1S)

FIG. 5
BUTTON SET 210
(PART OF STATION 10-1)

| LINE PREF SWITCHES 1 2 | LINE PREFERENCE | LINE PREF CODE |
|---|---|---|
| 0 0 | NO LINE PREFERENCE | 0 0 |
| 1 0 | PRIME LINE PREFERENCE | 1 0 |
| 0 1 | RINGING LINE PREFERENCE | 0 1 |
| 1 1 | IC LINE PREFERENCE | 1 1 |

FIG. 8

| OTHER PU LINE SWITCHES L7 L6 L5 L4 L3 L2 L1 L0 | OCTAL NO. | SET TYPE | SET TYPE CODE |
|---|---|---|---|
| 1 1 1 1 1 1 1 1 | 377 | NONE ATTACHED | 000 |
| 1 1 1 1 1 1 1 0 | 376 | 5-BUTTON | 001 |
| 1 1 1 1 1 1 0 1 | 375 | 5-BUTTON LINE POOL | 010 |
| 1 1 1 1 1 1 0 0 | 374 | NO-BUTTON | 011 |
| 1 1 1 1 1 0 1 1 | 373 | ATTENDANT | 100 |
| ANY OTHER | | 10-BUTTON | 000 |

PROGRAM CONTROLLED COMMUNICATION SYSTEM HAVING INDIVIDUALLY REARRANGEABLE LINE SELECTION

CROSS-REFERENCE TO RELATED APPLICATION

This application is a continuation-in-part of our copending application, Ser. No. 832,888, filed Sep. 13, 1977, now abandoned.

BACKGROUND OF THE INVENTION

This invention relates to program controlled communication systems and more particularly to such a system where the line appearance assignments are easily assignable and rearrangeable.

In communication systems where several different lines terminate at a single station it is necessary to give the station user the ability to select which line is to be utilized for any particular call. This selection is usually accomplished by the use of keys individually associated with each of the lines.

In prior art systems the particular assignment of the line to the key has been accomplished by means of directly wiring the line circuit to the key. In order to change such an assignment it has been necessary for a craftsperson to manually rearrange the cross-connect wiring. An example of such a system can be seen in the R. E. Barbato et al U.S. Pat. No. 3,436,488 issued Apr. 1, 1969. In some newer program controlled systems it has become possible to assign each line to a particular key at each station by means of a memory, which memory is then interrogated by a processor for proper system control. While such an arrangement has been utilized to advantage and has proven to be easier to rearrange than the prior manual method, problems are encountered in that every time a change is required the change information must be read into the machine in order to change the memory correlations. Typically, such changes require the preparation of a coded machine input, on tape or on punched cards, which coded input is then provided to the machine processor for storage in the translation memory. For economical operation it is thus required that the changes be made on a batch basis.

Accordingly, it is an object of our invention to provide an arrangement whereby the line assignments of a program controlled communication system can be rearranged easily on an individual basis, without sophisticated programming techniques, or complex adjunct programming equipment.

It is a further object of our invention to allow for easily assignable prime line pickup on one key while allowing the other pickup keys at the station to become assigned to other system lines, while at the same time allowing for preselection of ringing on any of the lines. It is a further object of our invention to allow for expansion or reduction in the number of station sets and to allow for a mix of station set types, all without requiring extensively coded input data to the processor.

SUMMARY OF THE INVENTION

The foregoing problems of the prior art are overcome by an embodiment of our invention which utilizes switches associated with each of the station sets to control the pickup function of the keys. The switches are human factors coded so that the user may rearrange the pickup keys at the station at any time, merely by changing the setting of the switches.

The switches are mounted on the associated station line card which is typically mounted in a housing central to the telephone sets and in proximity thereto. The user establishes which line, for example, line 3, is to be the prime line at a station. The user then sets the proper combination of switches on the line card associated with the prime line control. In the situation where line 3 is to be the prime line, then switches 2 and 1 would be set.

Eight other switches are provided, each associated with a different line. The user sets the switches corresponding to the lines which are to be associated with the telephone set. For example, assuming that lines 2, 4 and 6 were to appear on the same station set where line 3 was designated as the prime line, then, in addition to the setting of switches 2 and 1 in the "prime line" group of switches, switches 2, 4 and 6 in the "other pickup" group of swiches would be set also.

A third group of switches is associated with ringing control. In the event that ringing is desired only on the prime line then only the switch associated with pickup key 1 would be set.

The processor is arranged to read the switches periodically and to place the output readings into the system translation memory in machine readable form. Thus, while the switches are set in human factors coding, the machine translates this coding into processor coding for use in system operation. The scanner is arranged to scan each line card in turn on a periodic basis. When a missing line card is interrogated the memory word obtained is all 1's and this is taken as a signal that there are no more stations connected and the scanner then starts rescanning the line card switches. Special station types are handled by special codes established by the switches.

Accordingly, it is a feature of our invention that individual switches are provided associated with each station set and arranged in a manner to allow lines to be assigned to pickup keys on an individual basis.

It is a further feature of our invention to provide a program controlled communication system having user changeable features and line selection control arranged such that the user, by setting individually provided switches, can establish any line as a prime line and may select which other lines appear at the station.

It is a still further feature of our invention to provide a program controlled communication system having user controlled switches which are sequentially interrogated by a processor to determine the line and station status of the system.

BRIEF DESCRIPTION OF THE DRAWING

The foregoing features and objectives together with the operation and utilization of the present invention will be more apparent from the following description, taken in conjunction with the drawing, in which.

GENERAL DESCRIPTION

Figure 1:
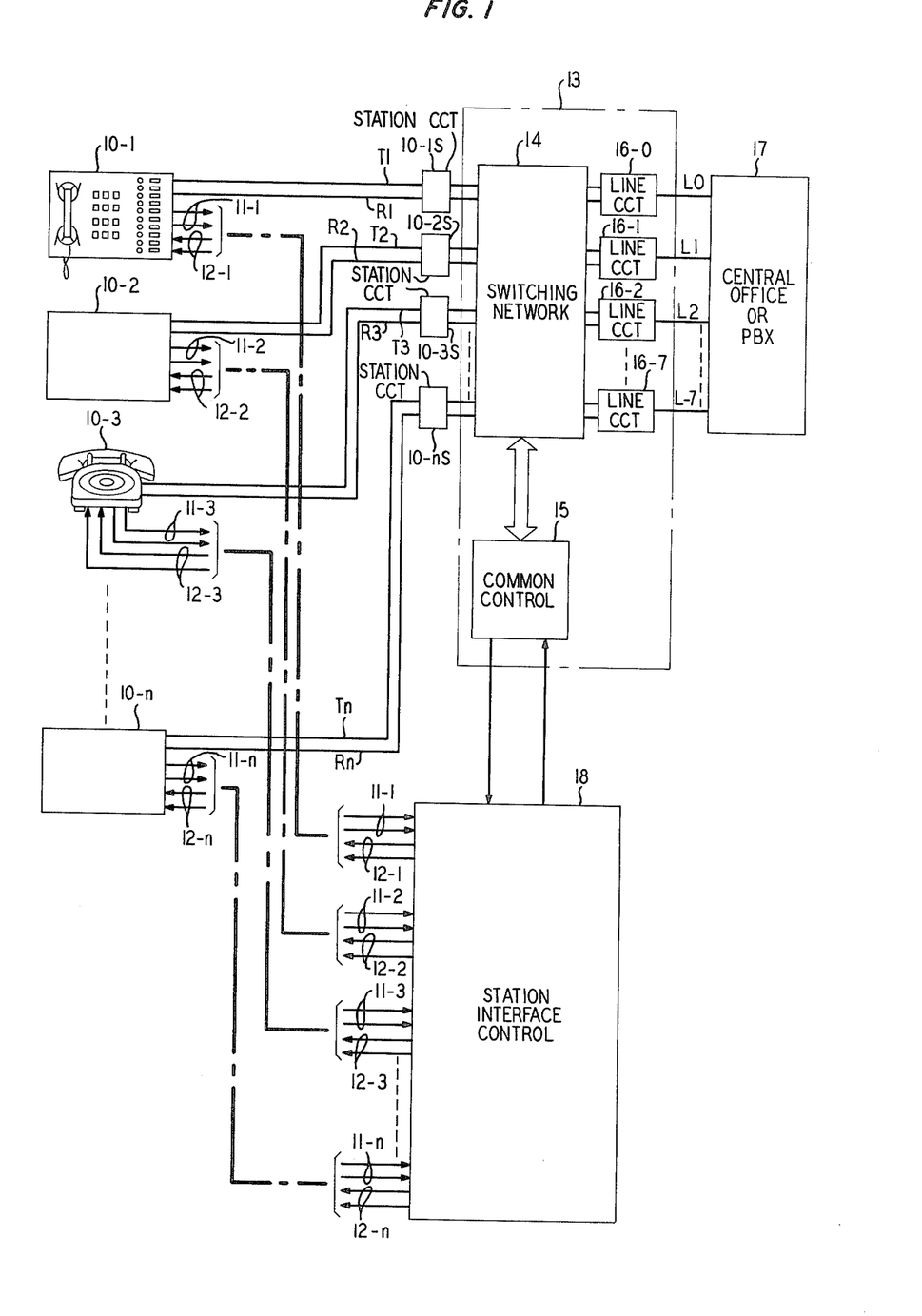
FIG. 1 shows an overall system configuration having several multibutton telephone stations (and one single-line station)

As shown in FIG. 1 an electronic key telephone system is arranged with several stations, such as stations 10-1, 10-2, having multibutton capability. Station 10-1 has 10 buttons, five of which are used to select different lines and five of which are used to control other features associated with the station. Thus a subscriber utilizing station 10-1, by momentarily pushing one of the five line selection buttons, may communicate from station 10-1 over a selected one of the five lines associated with that station. As shown, the system has eight central office (or PBX) lines, L0 to L7, each associated with a line circuit 16-0 to 16-7. Each station is associated with a station circuit, 10-1S to 10-nS. These station circuits are arranged on plug-in boards and typically two such station circuits are arranged on a single board.

Each 10-button station can control any five of the eight lines. However, the lines which appear at a station are preselected in the manner to be discussed. Once the preselection is made the same five lines will continue to appear at that station until a new selection of lines is made. Thus, the lines which appear at a station are semipermanent in nature. The system is arranged with a memory which contains within it the line-station correspondence and the system processor continually scans the memory for the purpose of controlling connections between the lines and the stations.

Figure 7:
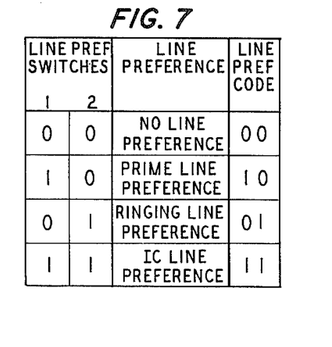
FIGS. 7 and 8 show charts of switch coding used for special feature control.

It should be noted that although a station has five line pickup buttons, all such buttons need not be assigned. In addition, several possible variations exist. Namely, one of the lines can be designated as the prime line. In such a situation, the designated line is the one to which the subset becomes connected upon going off-hook when none of the pickup buttons is preselected by the station user and no line on the station is ringing. Typically, the prime line is the line which appears on the uppermost button and, as shown in FIG. 7, is designated in binary format as line preference code 10 (binary).

Another situation which could occur is one in which the line preference is the ringing line. In such a situation, the station set, upon going off-hook during the incoming call interval, would be connected to the ringing line without the momentary operation of the ringing line pickup button. The station could be arranged, of course, for no line preference (code 00) or for intercom line preference (code 11). The manner in which these preferences are established will be discussed more fully hereinafter.

Figure 4:
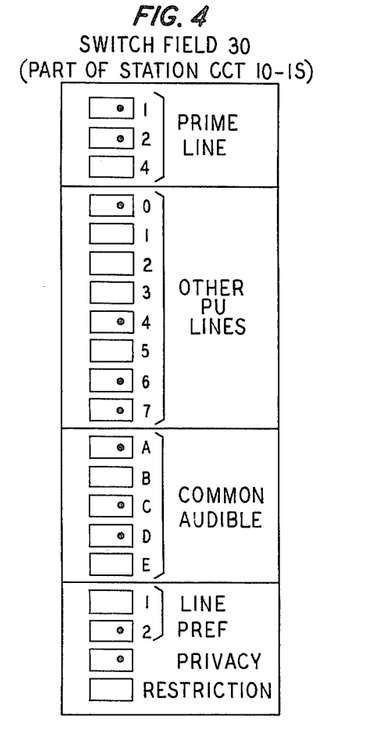
FIG. 4 shows an expanded representation of a single switch field.
Figure 6:
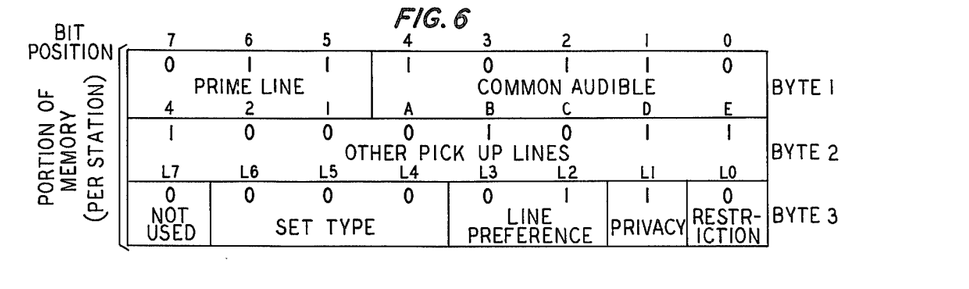
FIG. 6 shows a typical arrangement of the bit information contained in a memory.
Figure 8:
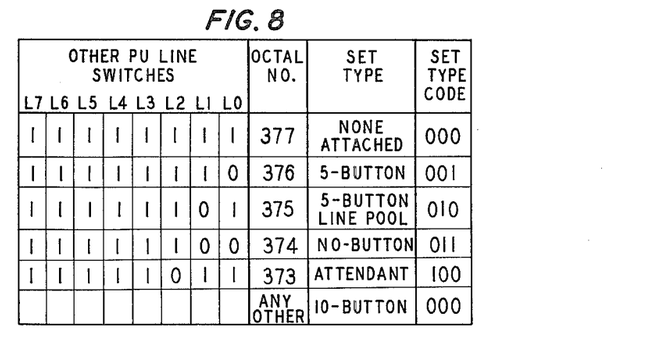

In addition the system is designed to operate with a single line station, such as station 10-3, and with 5-button station sets (not shown). The set type is administered through special arrangements of the "other pickup lines" switches shown in FIG. 4. This information will be interrogated by the system and translated into a 3-bit "SET TYPE" information as shown in FIG. 6 (in byte 3), by reading the "other pickup line" switches, as shown in FIG. 4. Single line no-button station sets are given binary code 011 (refer to FIG. 8) while 5-button sets are given code 001. When a line pool is used with a 5-button set code 010 is established while code 100 is used to designate attendant station sets. These codes are manually assignable on a station-by-station basis, utilizing the switches shown in FIG. 4, and can be easily changed, all in the manner to be detailed hereinafter.

The manner in which the overall system operates is discussed in Huizinga-Underhill-Whitcomb 4-1-1 filed Oct. 27, 1976, Ser. No. 735,991, now U.S. Pat. No. 4,046,973 issued Sept. 6, 1977, which application is incorporated by reference herein. Also incorporated by reference is U.S. Pat. No. 3,660,611 dated May 2, 1972, which patent shows a program controlled key telephone system with station modules forming the interface between PBX, the CO lines and the stations.

Figure 2:
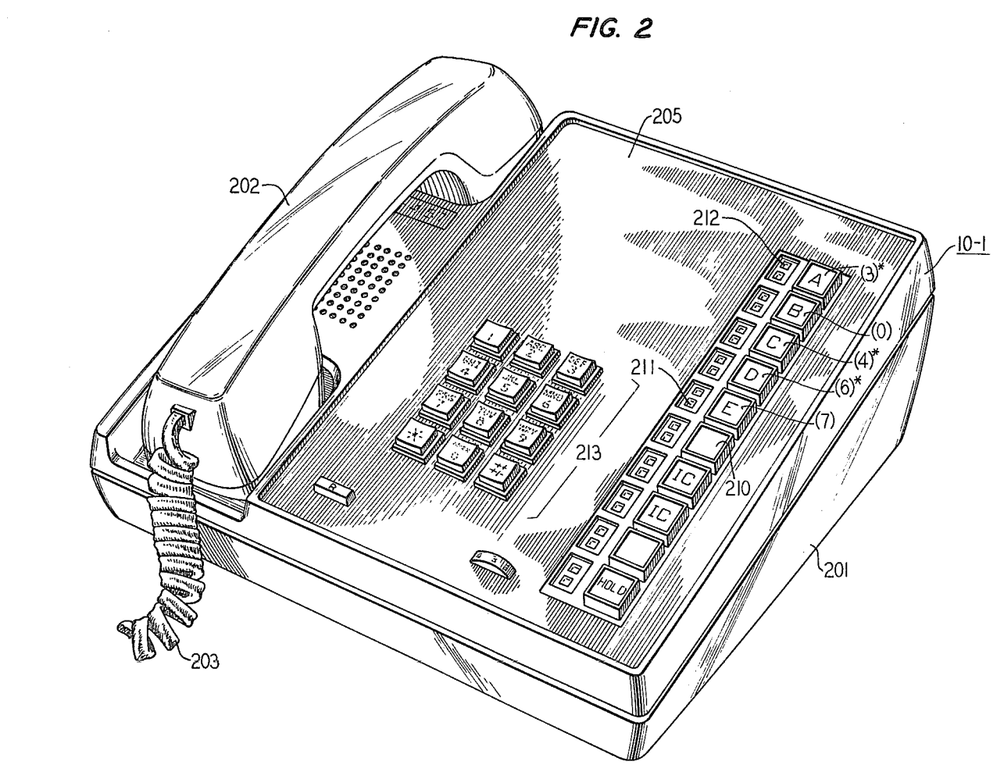
FIG. 2 shows a pictorial representation of a multibutton telephone station set.

Turning to FIG. 2, a typical multibutton station set is shown with pickup buttons being labeled A, B, C, D and E of button set 210. Along the right-hand side of the face plate there is mounted a plurality of nonlocking line selection pushbuttons. Adjacent to each button are a pair of light emitting diode (LED) lamps 211 and 212. LED 211 provides a visual indication of which one of the lines having an appearance on station set 110 are in use at other locations. LED 212 provides a visual display as to which one of buttons 210 has been selected by a user.

As shown, the unlabeled buttons are spare buttons and the buttons labeled IC are used for intercom control, i.e., intrasystem connections. The bottom button is used for hold control purposes. The numbers in parentheses opposite buttons A though E indicate the preselected central office lines which are currently associated with the respective buttons. For example, as shown in FIG. 2, topmost button A is associated with CO line L3, while button B is associated with CO line L0. These line assignments are semipermanent and will continue until changed manually in the manner to be described. Since station 10-1 is connectable to five different lines it is necessary to also establish on which lines station 10-1 will provide audible ringing indications. The manner in which such provision is made for each line will be discussed in more detail hereinafter.

For the moment, however, let us assume that ringing, or other audible signals, are to be provided on lines L3, L4 and L6 at station 10-1 (buttons A, C and D respectively). In this situation when an incoming call is present on line L4 visual indication would be provided to button C while audio signals would be provided to station 10-1. At such a time, the subscriber at station 10-1, by pressing button C, and going off-hook with handset 202 can communicate over CO line L4. It should be kept in mind that line L4, as well as the other lines, may appear on several other stations and at each of these stations provision must be made for providing audible signals or inhibiting audible signals.

As discussed above, in multibutton key telephone arrangements it is sometimes desirable to provide one of the buttons as a prime line button, such that the subscriber going off-hook without depressing any button automatically becomes associated with that line. Typically such a prime line is associated with button A, and, in our example, the prime line associated with station 10-1 is line L3. Thus the subscriber at station 10-1 simply by going off-hook becomes connected to line L3 even without depressing button A. It should be noted from the arrangement of the lines associated with buttons A through E that the prime line appears in conjunction with button A regardless of its numerical designation, while buttons B, C, D and E have associated with them the lines in numerical sequence with the lowest being assigned to button B and the highest to button E. Thus if it were decided to maintain the same grouping of five lines, namely, lines L0, L3, L4, L6 and L7, but to have line L4 as the prime line, the order of lines on the buttons would be 4, 0, 3, 6 and 7, and the manner in which this would be accomplished, under manual control will be discussed hereinafter.

Figure 3:
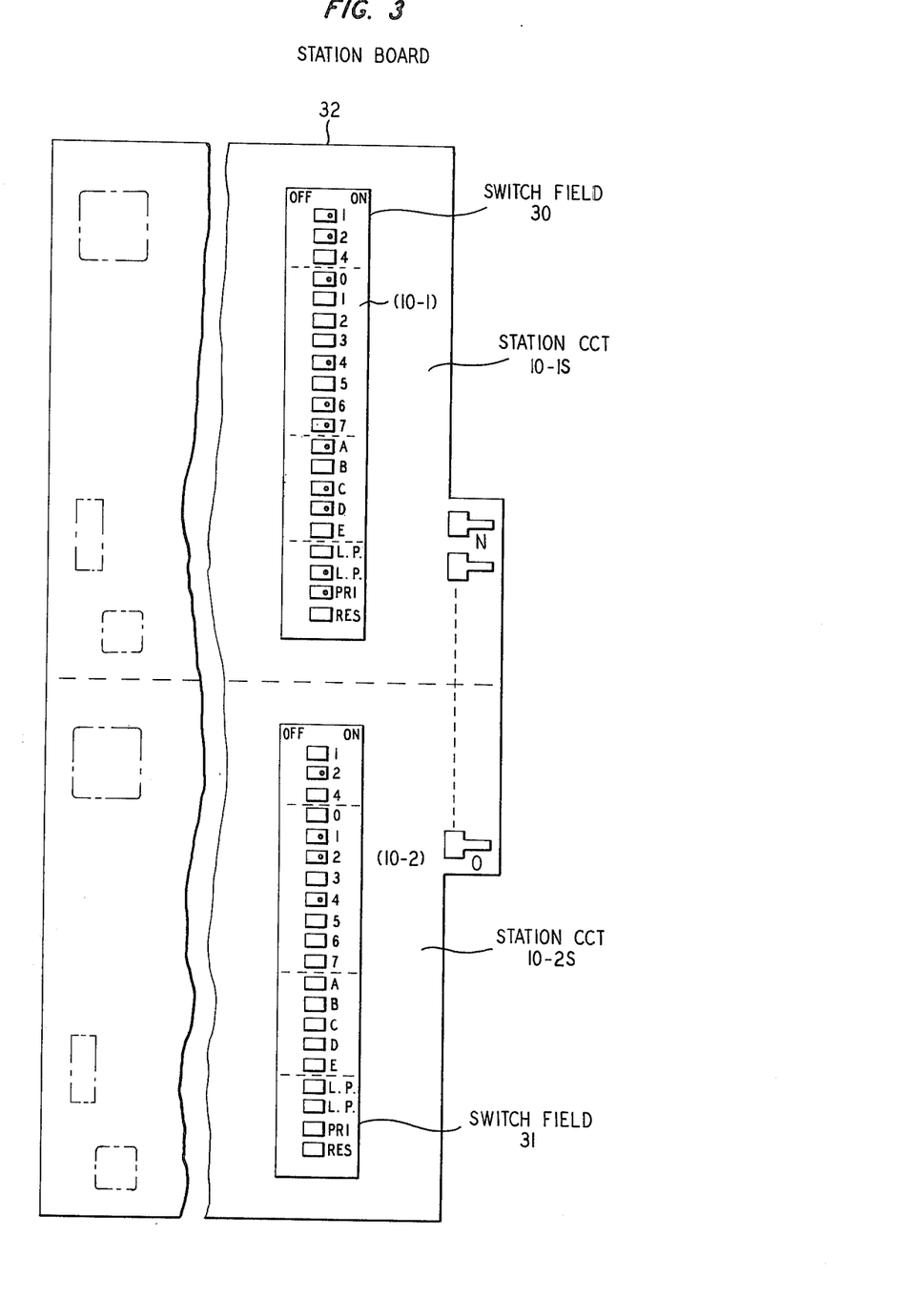
FIG. 3 shows a station card circuit arranged to control two telephone stations, each station circuit having associated with it a switch field for controlling line and feature selection.

Turning now to FIG. 3 there is shown a portion of a typical station board having contacts O to N for insertion into the system. Station board 32 is a dual circuit board handling two stations, namely stations 10-1 and 10-2. Switch field 30 is associated with station 10-1 (station circuit 10-1S) and switch field 31 is associated with station 10-2 (station circuit 10-2S). The utilization of station boards having two station circuits is purely a matter of convenience of system architecture.

Each switch field, such as switch field 30, has twenty 2-position on-off switches of the slide or toggle variety. The switches are arranged such that when the switch is in one position (no dot) the switch output is low (Logic 0) and when the switch is in the other position (dot) the switch output is high (Logic 1). Thus, in FIG. 3 with respect to the top three switches of switch field 30, switches 1 and 2 are on and switch 4 is off, thereby generating the binary bits 011.

Figure 5:
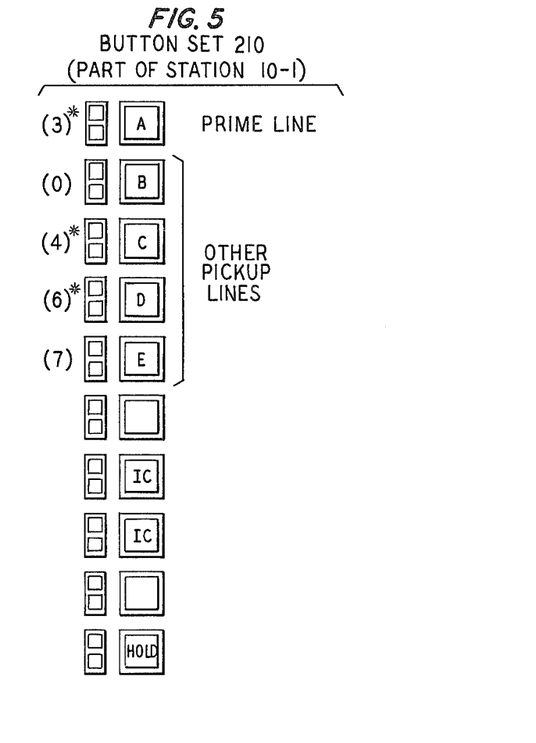
FIG. 5 shows a representation of the line selection buttons of a multibutton telephone station set.

Turning now to FIGS. 4 and 5 let us assume that it is desired to establish line L3 as the prime line associated with station 10-1. Then switches 1 and 2 of switch field 30 are turned on while switch 4 is turned off. These switches, it will be recalled, are located on the station board associated with station 10-1. Let us also assume that it is desired to establish lines 0, 4, 6 and 7 as "other lines" controlled by station 10-1. In such a situation, in switch field 30 using a second group of switches numbered 0 through 7 (each corresponding to a possible one of the eight CO (or PBX) lines) switches 0, 4, 6 and 7 are turned on while switches 1, 2, 3 and 5 are turned off. Since line 3 has been selected as the prime line, line 3 appears in association with button A while the remaining selected lines appear in order of numerical sequence associated with buttons B, C, D and E, as shown in FIG. 5.

Assuming that it is desired to have audible signals on lines 3, 4 and 6, switches A, C and D in the set of switches in switch field 30 labeled A, B, C, D and E are operated.

Turning now to FIG. 6, the manner in which the switches are read out into the memory will now be discussed. The processor scans the station circuits in sequential order and using an 8-bit word each set of switches is read in 3 bytes. In byte 1, bit positions 0, 1, 2, 3 and 4 contain the common audible information from switches E, D, C, B and A respectively. Bit positions 5, 6 and 7 correspond to prime line switches 1, 2 and 4 respectively. Byte 2, bit positions 0 through 7 represent CO lines L0 through L7 respectively, while in byte 3, bit 0 controls station restriction, and the restriction switch is read directly; bit 1 controls station privacy; bits 2 and 3 control line preference as shown in FIG. 7. Bits 4, 5 and 6 record the set type and bit 7 is not used. The bits for the set type are system generated by the processor, from the setting of the "other pickup lines" switches (FIG. 4), in accordance with the chart shown in FIG. 8. In the situation where a station board is not present, which situation occurs when a station is unassigned, all of the interrogated switches appear as highs (1's) and thus in byte 2 all bits would be 1 which, in octal coding, is 377. When such a situation is encountered the processor determines from the 377 that no set is present. Since such a situation represents the end of the scan cycle the present count of stations as contained in the processor controller (which count includes the currently interrogated station line board) is reduced by 1.

In situations where a 5-button set is used (having only one line pickup button) "other pickup lines" switches 1, 2, 3, 4, 5, 6 and 7 on the associated station board are operated while switch 0 is left unoperated thereby resulting in byte 2 having the octal word 376. In such a situation the processor sets the set type code of byte 3 to code 001 and the prime line of the associated station is the prime line established by switches 1, 2, 4 of the prime line switch set.

When byte 2 contains the octal word 375 which corresponds to switches 0, 2, 3, 4, 5, 6 and 7 operated, the set type code is determined by the processor to be set type code 010. This is a 5-button set having a line pool. A no-button telephone set (such as set 10-3, FIG. 1) would be an octal word of 374, code 011, and would be established on swiches 2, 3, 4, 5, 6 and 7. For an attendant set the set type code would be code 100, the octal would be 373 generated by operating "other pickup line" switches 0, 1, 3, 4, 5, 6 and 7, on the station board associated with the attendant set.

In summary then, each station in the system has associated with it a station circuit, which, in the disclosed embodiment, is mounted on a printed wiring board. Each such circuit is equipped with a set of switches, which set of switches is further divided into subsets for control purposes. One subset of switches is used to control the prime line of the associated station or in the alternative, if prime line pickup is not utilized, the same subset of switches is used to select which of the lines will appear on the "first" pickup button. Another subgroup of switches is used to control which preselected "other lines" will also appear at the station.

The system, as disclosed, contains eight CO or PBX lines at most, five of which may appear at any one station. Thus, by operating the switches associated with each station the central system control memory can be easily updated without delay and without batch processing of the updated information. Since the switches are coded directly in accordance with the lines to which the station desires to become connected, the station user may easily make these changes without extensive training or code lookup. In addition, since there are eight "other pickup lines" in one subgroup of switches, and since only four of these can be used for line selection at any one station, these same switches can serve a dual function of system control, simply by operating more than four switches. In such a situation, the processor interprets the coded word, not as a direction to connect more stations but rather as a direction, in accordance with the table in FIG. 8, to treat the station in a special manner.

While the electronic key telephone system disclosed in the embodiment has only eight central office or PBX lines, the inventive concepts disclosed and claimed are applicable to systems having different numbers of lines and architecture. In situations where a different number of lines is used the first subgroup of switches on the station control circuit must have the number of switches necessary to establish in binary format the basis equivalent of the highest number of line served by the system and the second subgroup of switches must contain the same number of switches as lines served by the system. Thus, if the system were to have between 9 and 15 lines, there would be four switches in the first subgroup and up to 15 switches in the second subgroup.

Detailed description

Figure 9:
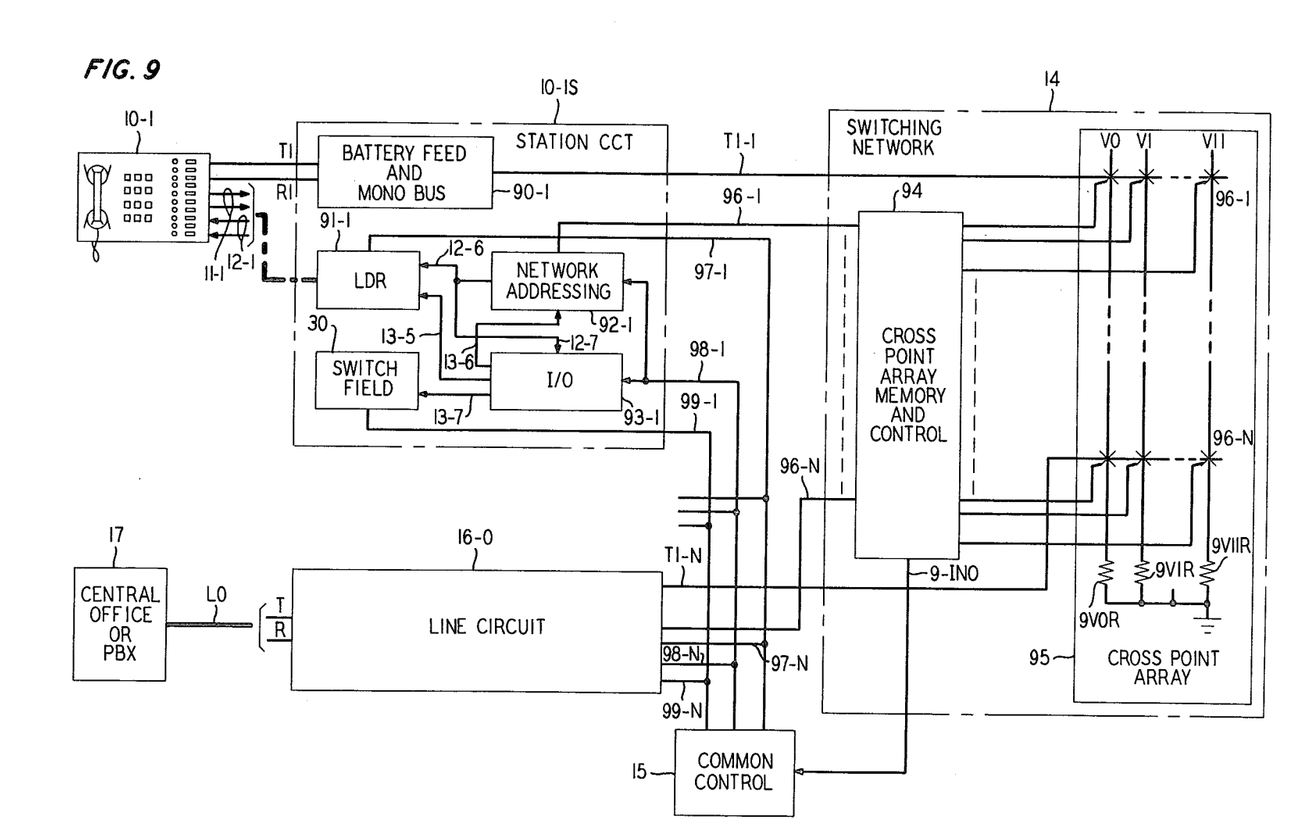
FIG. 9 shows an expanded block diagram of a typical system.
Figure 10:
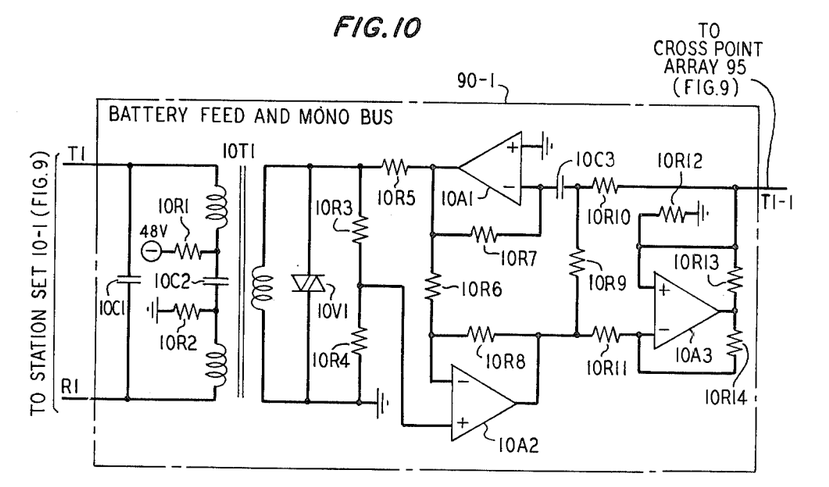
FIGS. 10, 11, 12, 13 and 14 show details of the various blocks of station circuit.

Turning now to FIG. 9 station in circuit 10-1S is shown in detail and includes battery feed and monobus circuit 90-1, line driver and receiver (LDR) 91-1, network addressing 92-1, input/output (I/O) buffers 93-1 and switch field 30.

Figure 12:
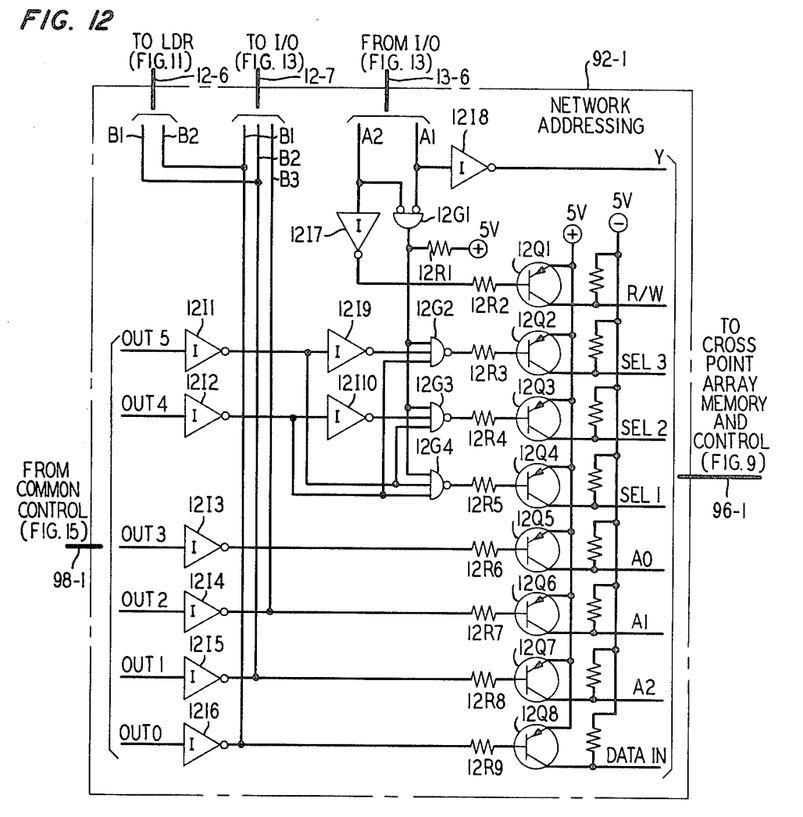

Audio from station 10-1 enters station circuit 10-1S over the T1 and R1 leads and is fed through battery feed and monobus circuit 90-1 and over lead T1-1 to the horizontal of switching network 14 associated with station 10-1. Battery feed and monobus circuit 90-1 operates in the manner disclosed in U.S. Pat. No. 3,991,279 dated Nov. 9, 1976, issued to D. J. Morgan et al. The monobus circuit converts the voltage signal to a current which then flows along the station's horizontal of switching network 14 to the connected vertical via any operated one of the crosspoints V0 through V11. Current then flows down the vertical through the terminating resistor, such as resistor 9V0R for vertical V0. Typically the crosspoints would be constructed from a solid state array operating in the manner well known in the art under control of crosspoint array memory and control 94 which circuit in turn is operative under control of each station circuit network addressing control 92-1 in the manner detailed in FIG. 12.

Digressing momentarily, it will be noted that FIG. 9 differs slightly from FIG. 1 in that the circuitry contained in station interface control 18 of FIG. 1 is shown distributed among the station and line circuits in FIG. 9. Such a distribution of elements provides economies in that as each station is added a corresponding station circuit board is utilized so that the system may grow in direct relationship to the number of stations and lines served by the system. Such an arrangement avoids unnecessary electronic equipment in a central location.

Returning now to FIG. 9 the data controlling the system flows via a parallel data bus extending from common control 15 over cables 97-1, 98-1 and 99-1. Since all of the data is transmitted in parallel to all of the line circuits the input output circuit 93-1 in each station or line circuit operates under control of data provided on cable 98-1 from common control 15 to select which one of the station or line circuits is to receive or send the desired information.

Turning now to FIGS. 15, 16, 17 and 18, the common control circuit is controlled by microprocessor 155 which can be any commercially available microprocessor as, for example, Intel 8080A CPU. Bus control 156, which typically can be an Intel system controller 8228 coupled with clock 151 which typically can be an Intel 8224 clock generator, provides support in a well known configuration.

A countdown chain consisting of counter 152 and 153, which typically can be Texas Instruments (TI) chip 74490 coupled with clock counter 154 which typically can be TI chip 7490, derives a 5 microsecond clock for the outpulsing circuit and a 25 microsecond clock for processor program cycle timing. The TIME lead rises to a 1 at 25 milliseconds after being cleared by the processor. If the processor does not clear the counting chain the TIME lead remains high. The program reads the time signal through latch 161 with a A←IN(8) instruction. This latch typically can be Intel chip 8212.

Bus drivers 157, which typically are noninverting driver chips such as National 8095, buffer the memory address bus which extends to ROM memory 159, to RAM memory 160 and to decoder network 173 which typically can be Texas Instruments chip 74154.

Bidirectional bus driver 158, which can be Intel chip 8216, drives the processor data outward to the periphery and inward to the processor. If either a memory read (MEMR) or an input/output read (I/OR) instruction occurs the driver turns toward the processor; otherwise it drives data to the periphery from the processor.

The output data over bus 98-1 from control circuit 15 to the station circuits is held by latches 1611-1621, which typically can be Intel chips 8212. Latches 1611 and 1621 are loaded by the processor data bus on memory write instructions M(8000H)←A and M(8001H)←A respectively. A system strobe, turned on by writing one into memory location 8008H and off by similarly writing zero, activates peripheral circuits.

Input data returns to the Input Bus latch, which is automatically loaded by a 200 ns pulse occurring 1 microsecond after the strobe rises (becomes active). It may be read by the program using the A←IN(1) instruction. Note these A←IN(X) instructions are decoded by a coincidence of the I/OR bar (I/O read) and a memory address bit, e.g., MADO.

Four serially connected shift registers 167, 168, 169 and 170 make up the outpulsing data transmitter. They are loaded, 8 bits at a time, from the data bus. Memory addresses 8000H through 80009H define the range for loading the registers and counters to send data. This is so the HL register pair of the microprocessor can be used as an index register to step along this sequence. An 8 bit counter 171 and 172 counts up to overflow, determining how many bits shift out. E06 loads the count into the counter. The program sequences transmission by performing the following:
 (1) Load System Output Bus low byte.
 (2) Load System Ouptput Bus high byte.
 (3) Load lead byte, followed by the second, third and fourth bytes.
 (4) Load the Counter.
 (5) Write anything into 8007H, setting the receive shift bit, loading A '1' into the first bit of the receive shift register. The data receiving program tests this bit to assure that all bits were received.
 (6) Write A '1' into the strobe, at 8008H.
 (7) Write anything into 8009H. This unlocks the shift counter, shifting bipolar pulses out every 5 microseconds. When the counter overflows, the connected flip-flop 174 is reset, setting flip-flop 175 stopping the pulsing of SHFT, the shifting clock.

Pulse converter 183 operates to convert the dual input pulse RP and RN to a single serial data stream on the RECEIVE DATA bus. Converter 183 also provides shifting signals via the Receive Shift lead to registers 163, 164, 165 and 166 so that stored information from the station set is then provided to microprocessor 155 via bidirectional bus driver 158 and bus controller 156. The program can then remove the lead received byte with an A←IN(2) instruction, and the trailing received byte with A←IN(4).

Figure 11:
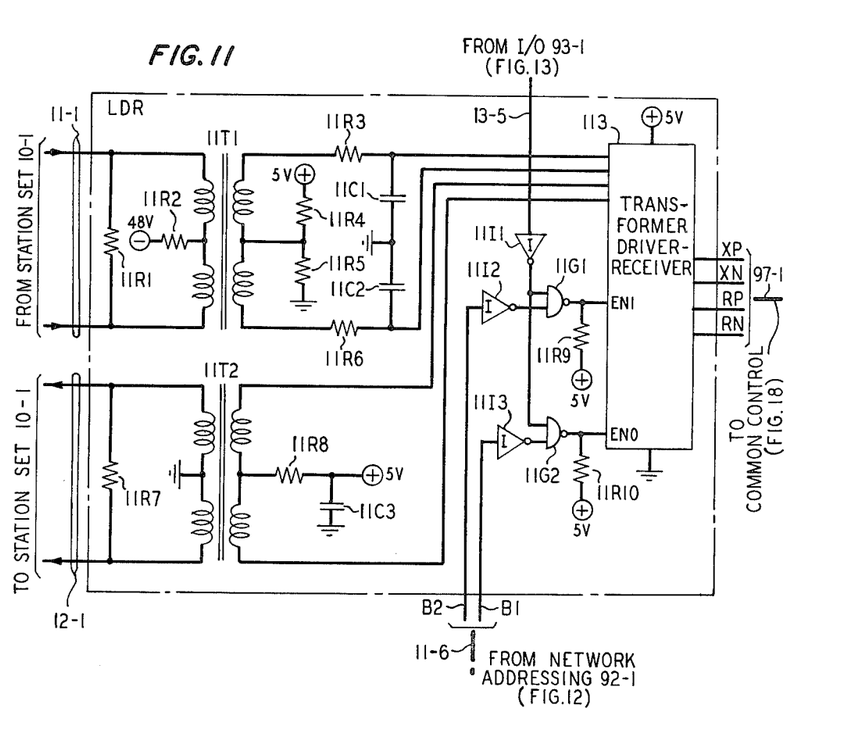

Returning to FIG. 9, one station board contains interfacing circuitry for two stations. For convenience, however, each station circuit is shown separately. The backplane wiring carries the top 4 bits of the OUTBUS double rail. These bits form the board address through backplane wiring. Each board position or slot then has a dedicated address. The stations plugged into a slot have dedicated access direct station select (DSS) number, given by the slot address. A board (FIG. 13) becomes active when the address and high strobe appears on the 5 input NAND gate, which selects the 1-of-8 decoder. This decoder decodes OUT 8 through OUT 10 to activate one of a number of functions. These are:

(1) (FIG. 13) OUT 10 through 8=000 allows transmission. When OUT 0 (FIG. 11) equals 1 station set 10-1 receives transmission and when OUT 1 equals 1 the next station (or station 10-2) receives transmission. OUT 0 and OUT 1 are gated through by function decoder 13-1 to enable the data to propagate through transformer-driver-receiver 113 (FIG. 11) to the appropriate station.

Figure 13:
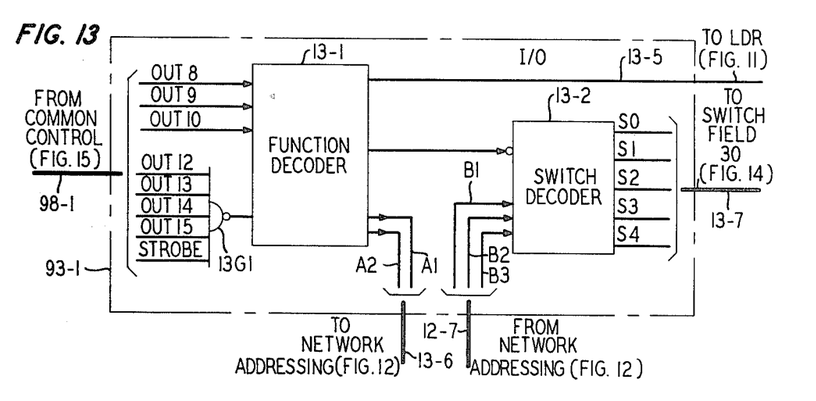

(2) OUT 10 through 8=010 allows writing the crosspoint switches. OUT 0 is the data used to control the crosspoint, such that '1' closes the crosspoint, and a '0' opens it. OUT 1 determines whether horizontal 0 or 1 is addressed. OUT 1=0 addresses station 10-1, OUT 1=1 addresses station 10-2. OUT 3 and OUT 2 address verticals 4 through 0 of all crosspoint chips in binary order. OUT 5 and 4 address the chip to be accessed.

(3) OUT 10 through 8=011 activates the READ function for the crosspoint chips. The read bit appears as bit 0 on the IN BUS.

(4) OUT 10 through 8=100 enables the switch decoder. OUT 2, 1 and 0 (FIG. 12) encode which switches are to be read, so that (000) reads in Prime Line and Common Audible switches for station 10-1; (001) reads "Other Pickup Lines".

Figure 14:
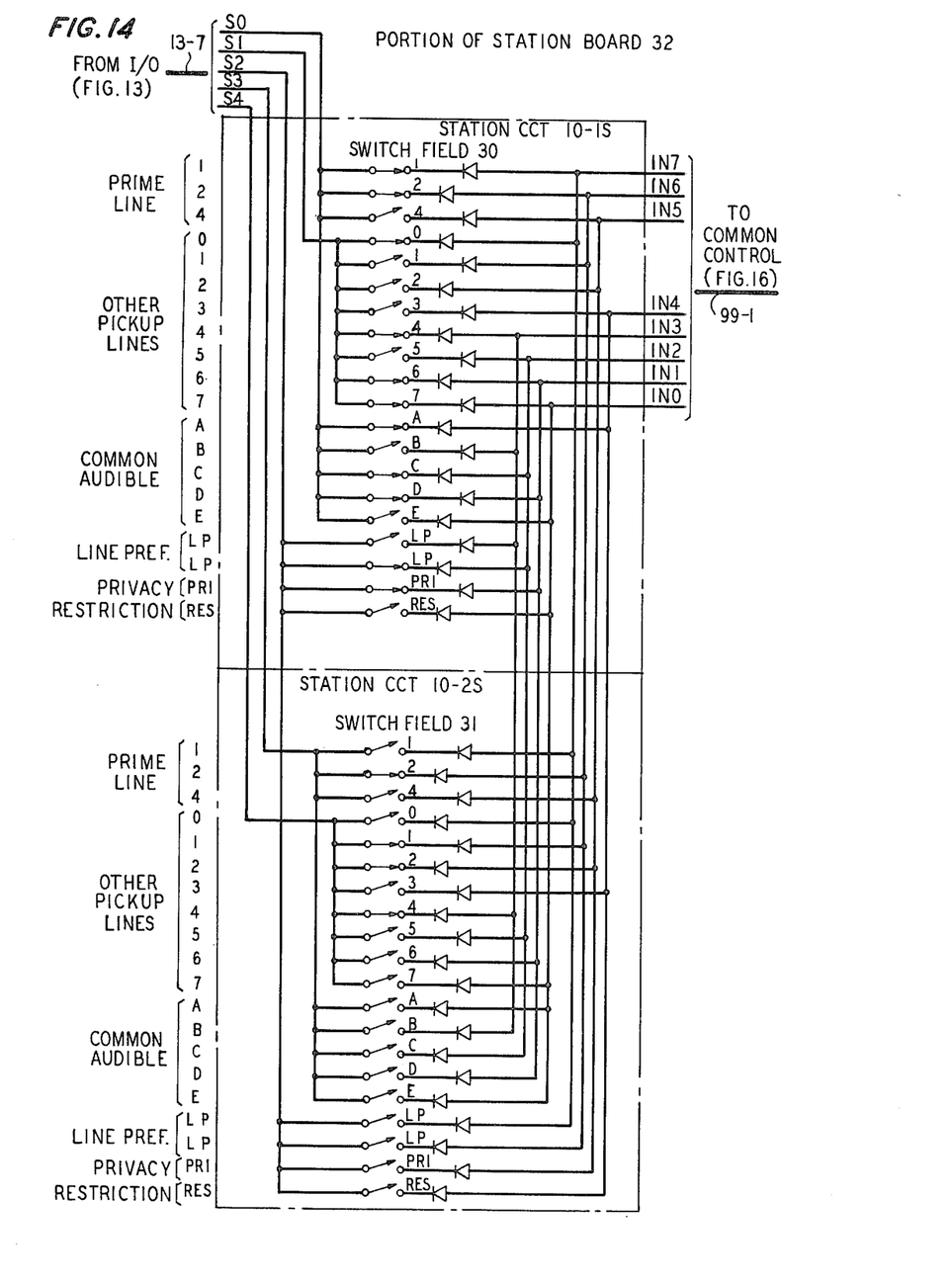
Figure 15:
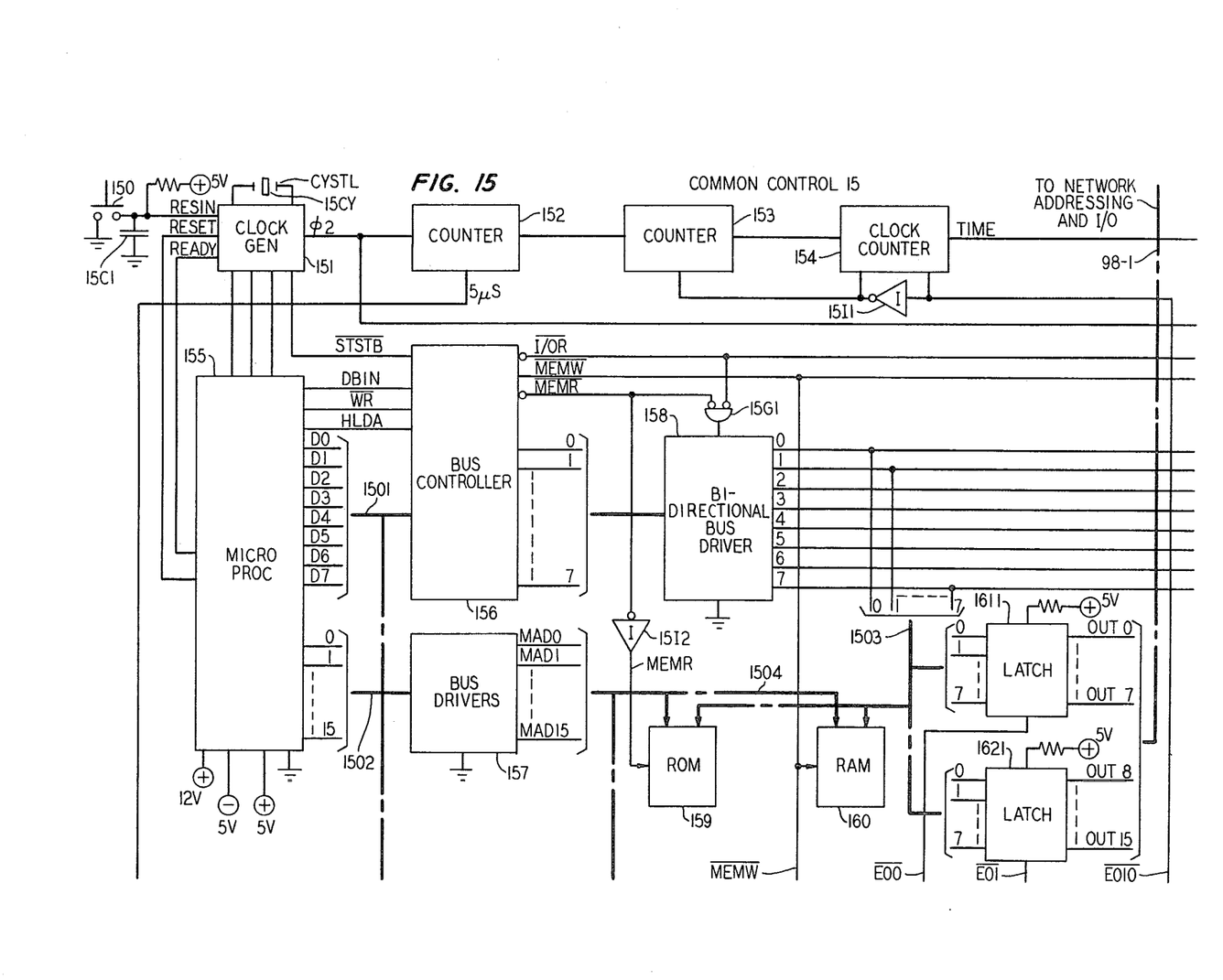
FIGS. 15, 16, 17 and 18 show details of the common control.
Figure 16:
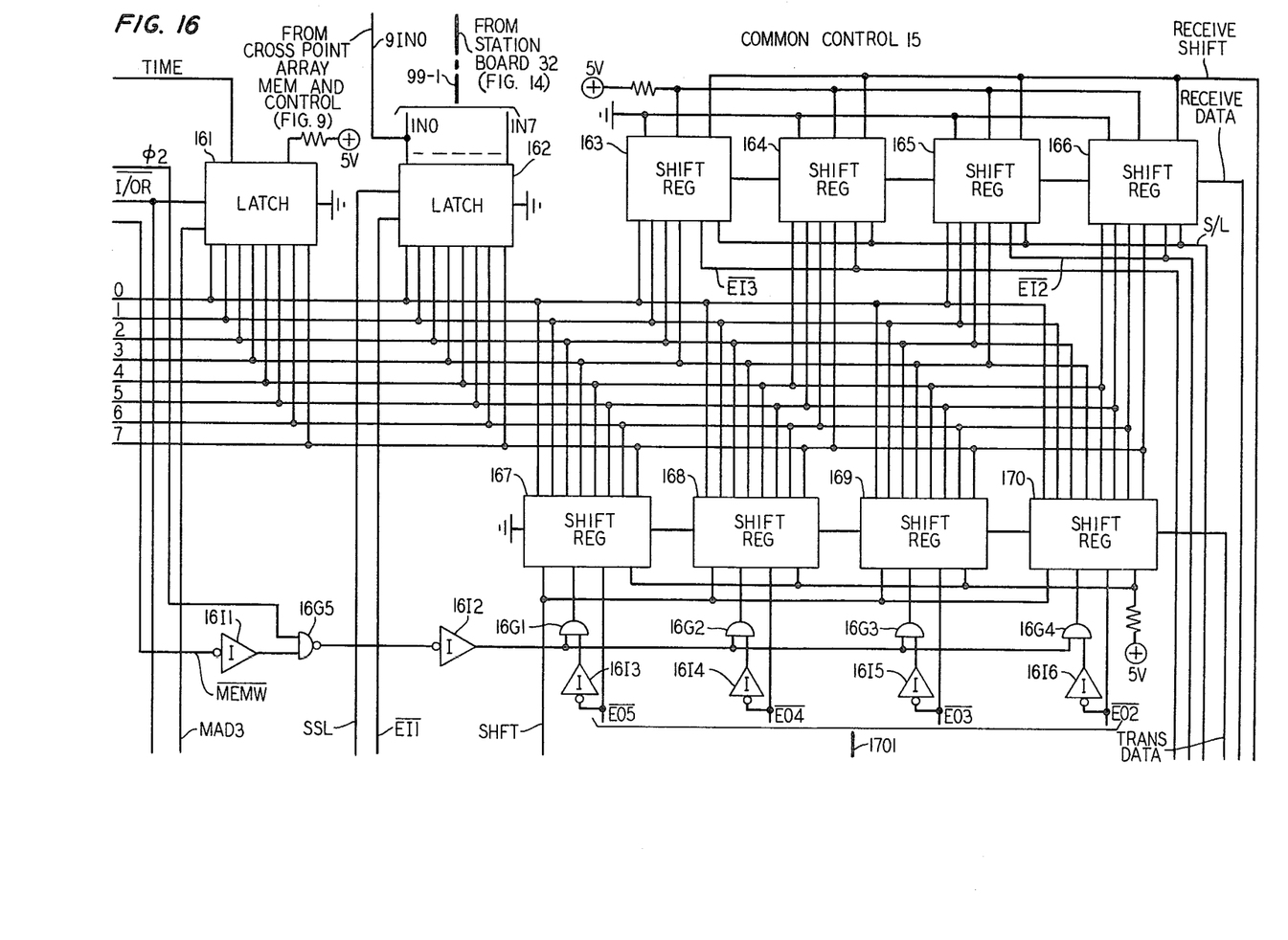
Figure 17:
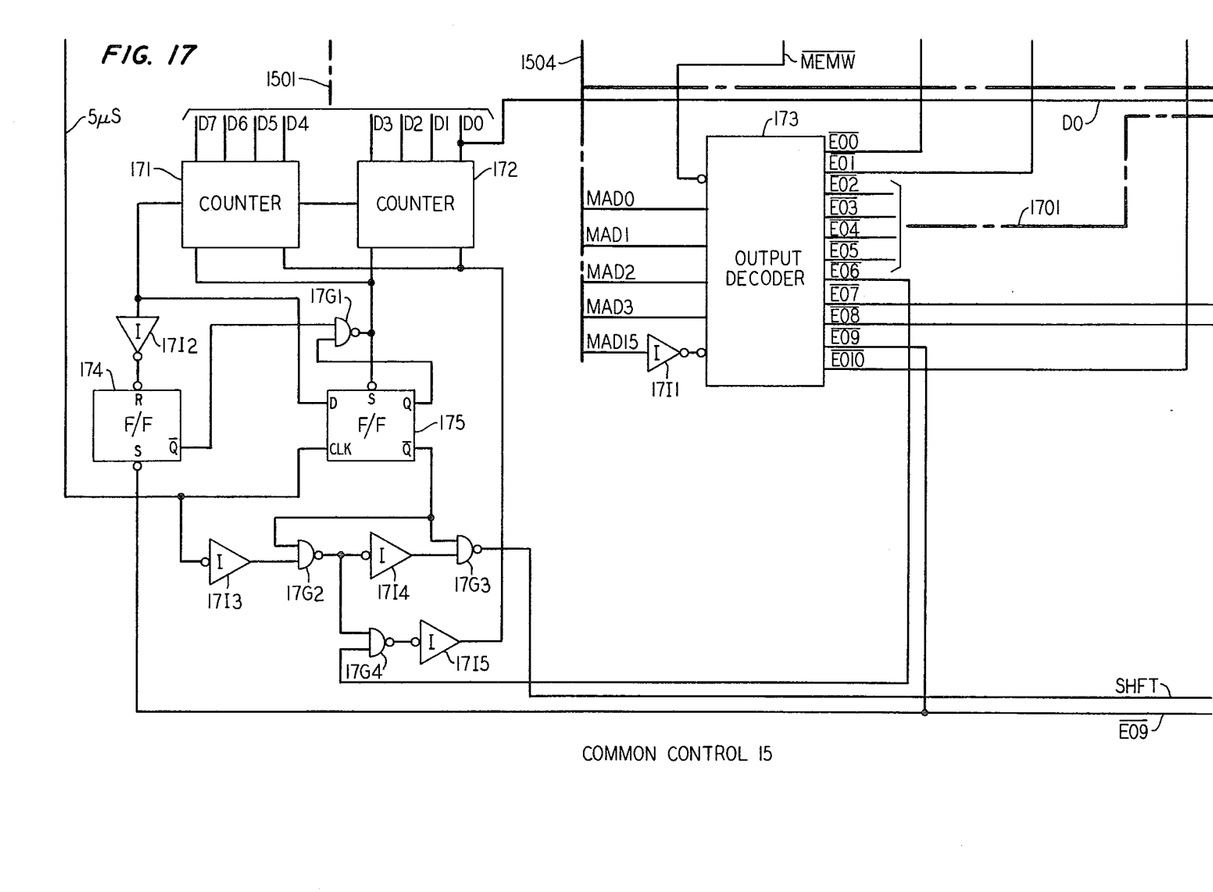
Figures 18, 19:
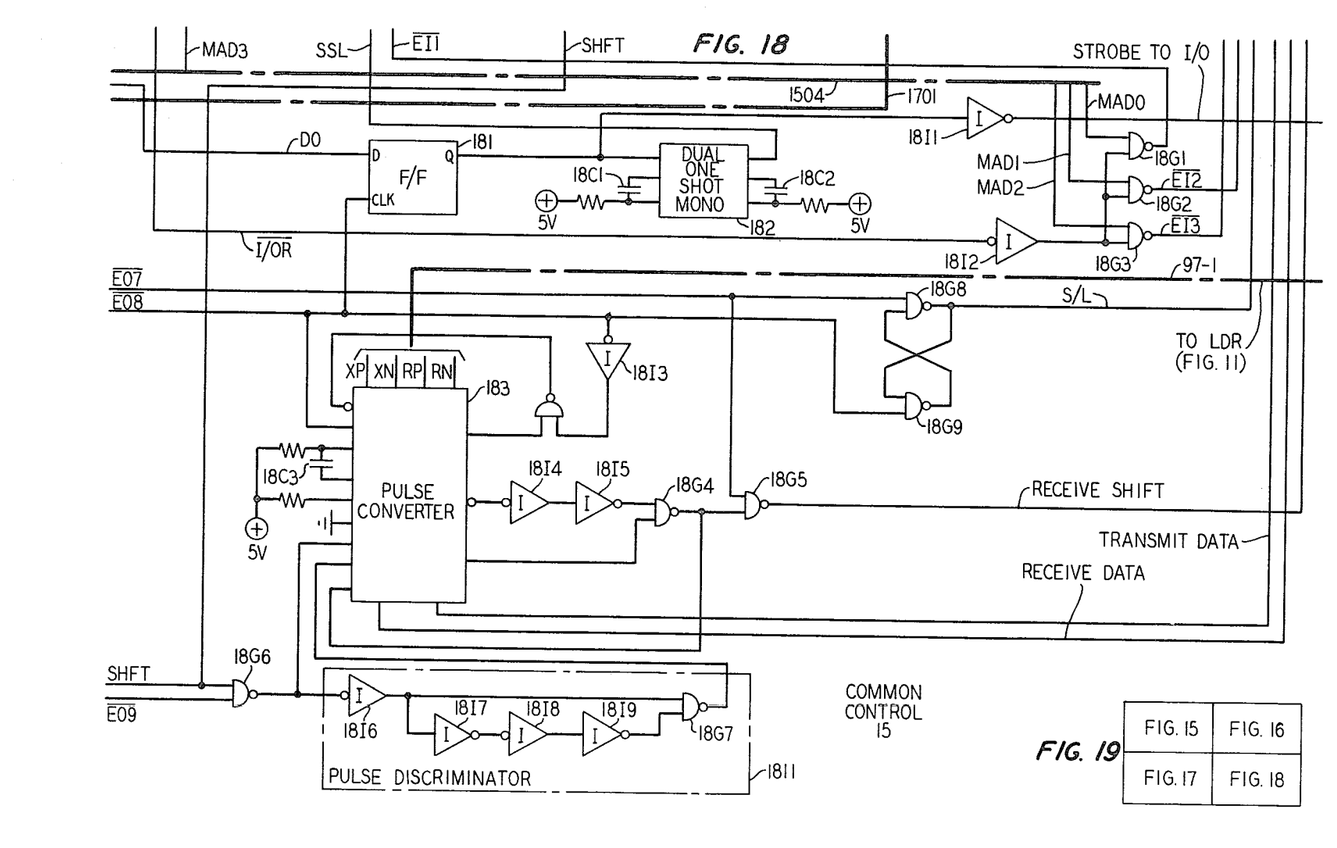
FIG. 19 shows how FIGS. 15, 16, 17 and 18 should be arranged.

Turning our attention to FIG. 14 there is shown two switch fields, such as switch field 30 and switch field 31. As discussed previously, switch field 30 is associated with station 10-1 and station circuit 10-1S, while switch field 31 would be associated with some other station switch station circuit such as station circuit 10-2S. These two switch fields are shown with the switches operated as indicated with respect to FIG. 3, as discussed previously. Thus switch field 30 is arranged so that line L3 would be the prime line associated with station 10-1. This is accomplished by manually operating switches 1 and 2 of the first three switches of the switch field. Also lines 0, 4, 6 and 7 are used as the "other lines" controlled by station 10-1. Thus switches 0, 4, 6 and 7 of the second group of switches of switch field 30 are operated. Thus as discussed previously, line 3 has been selected as the prime line and line 3 would appear in association with button A (FIG. 2) while the remaining selected lines, 0, 4, 6 and 7 become associated in numerical sequence with buttons B, C, D and E, (FIG. 2) respectively.

Continuing as discussed previously, since it is desired to have audible signals on lines 3, 4 and 6, switches A, C and D in switch field 30 are operated.

The manner in which the outputs of these switches are read into memory and utilized to control the system will now be discussed.

Turning to FIGS. 15, 16, 17 and 18, all communication with the station circuits is via latches 1611 and 1621 while all information coming back from the station arrives over bus 99-1 and latch 162.

There is stored in ROM 159 a series of program steps which operate to control output decoder 173 under control of microprocessor 155 to provide sequential addresses to latches 1611 and 1621 so that each station board is accessed sequentially one after the next in a fixed pattern under control of the ROM program steps. Thus, for example, with respect to station circuit 10-1S the address of that station is provided to latches 1611 and 1621 which, in turn, provide data bits on bus 98-1 to be decoded by input output circuit 93-1 of station circuit 10-1S (FIG. 9).

Thus, as shown in FIG. 13, the data bits controlling station circuit 10-1S, which arrive over cable 98-1, are provided to function decoder 13-1. When these bits denote a desire to decode switch information a control bit from function decoder 13-1 is provided to switch decoder 13-2 as an enable signal. Switch decoder 13-2 is a 1 out of 8 decoder. The B1, B2 and B3 inputs of switch decoder 13-2 are controlled via the inverter circuits of FIG. 12 from cable 98-1 from common control. Leads B1, B2 and B3 are used to determine which of the five leads S0 through S4 of the switch decoder output are operative at any time. The output of switch decoder 13-2 is communicated via cable 13-7 to switch field 30, and in the situation where more than one switch field is controlled from the same line circuit these outputs would be extended as shown in FIG. 14 to a second switch field, such as switch field 31.

Continuing in FIG. 14, when it is desired to interrogate a first group of switches lead S0 would go low thereupon providing outputs on the IN0 through IN7 leads corresponding to the switches enabled in a first subgroup. Thus, in our example, when S0 goes low a low output would be provided on leads IN7, IN6, IN4, IN2 and IN1 and a high on IN5, IN3 and IN0. This series of outputs is provided via cable 99-1 back to common control 15 (FIG. 16) and via latch 162 to bidirectional bus driver 158 under control of the input output read instruction of microprocessor 155 as stored in ROM 159. Accordingly, under control of the input/output read instruction (I/OR) which comes from bus controller 156, to gate 18G1 (FIG. 18) operates enabling the output of latch 162. Thus, at this point, microprocessor 156 has provided to it an indication of which manual switches in the first subgroup of manual switches in switch field 30 are operated.

As discussed, this information is decoded from input output latches IN0 through IN7 and provided to RAM 160 under control of memory instructions from ROM 159. The location within RAM 160 where the received information is stored is that location associated with station 10-1.

At this point latches 1611 and 1621 change their output bits under control of ROM 159 program via microprocessor 155 which new bits are in turn decoded by switch decoder 13-2 (FIG. 13) to provide an output on the S1 lead which output is utilized by switch field 30 (FIG. 14) to provide new input data on leads IN0 through IN7 corresponding to the operated ones of the switches in a second subgroup of switches. Thus, in our example, ground is provided on leads IN7, IN3, IN1 and IN0 representative of the condition of the switches in the second subgroup of switches. These grounds are provided via cable 99-1 in the manner previously discussed and are thus stored in RAM 160 of the contol circuit (FIG. 15) at the location corresponding to station circuit 10-1S. This procedure continues with interrogation of each subset of switches in each switch field of station circuit 10-1S under control of program steps in the ROM 159. When switch field 30 has been completely interrogated ROM 159 advances to the next program step and provides information to latches 1611 and 1621 under control of microprocessor 155 so that the data bits on the output leads OUT 0 through OUT 15 address the next station circuit in the sequence to obtain the information contained in the switch fields of the next station circuit.

Thus, as discussed, the control circuit continuously scans the switch fields of each station circuit to obtain the current line association with respect to that station. Since these switches are manually changeable and continuously scanned, any change of line assignment at a telephone station set will be easily implemented at the next scan cycle which occurs approximately every 6-10 seconds. RAM 160 in control circuit 15 is then updated to reflect the changes in the switches associated with the telephone station.

The system will work with any number of system processors and controllers which utilize memory control and will work in situations where the stations are only periodically scanned for system update information. Thus, in situations where real time becomes a problem the update information need only be read from the switch every few hours, or even once a day, since the system operates from a memory and not directly from the station circuit swiches.

Of course it is to be understood that the arrangements described in the foregoing are merely illustrative of the application of the principles of the present invention. Numerous and varied other arrangements may be utilized by those skilled in the art without departing from the spirit and scope of the invention.

We claim:

1. An electronic processor controlled communication system arranged for interconnecting a number of stations with a number of telephone lines where each station has access by momentary operation of one of a set of pickup buttons to a selected one of said lines, the combination comprising:
   a memory for providing system control information to said processor, said system control information including station and line correlation data,
   a station control circuit associated with each station, each such station control circuit including a set of manually operable two-position switches, each switch having a first position for generating a logic 1 output and a second position for generating a logic 0 output, each said switch set divided into subgroups such that a first subgroup of switches contains the number of switches necessary to establish in binary format the logic output equivalent of the highest number of lines served by the memory and a second subgroup of switches contains one switch for each line served by the memory,
   means for sequentially scanning said station control circuits to obtain the logic outputs of said switch subgroups, and
   means for providing said obtained logic outputs to said memory such that the binary coded logic output of said first subgroup of switches is operable to establish an association between a predetermined one of said pickup buttons at said associated station set and the line identified by said obtained binary coded logic output, and such that said obtained logic output of said second subgroup of switches is operable to establish which other ones of said lines are associated with other ones of said pickup buttons at said associated station set.

2. The invention set forth in claim 1 wherein each switch set contains a third subgroup of switches, said switches of said third subgroup utilized for establishing special features, such as prime line pickup, audible ringing and privacy, at said associated station.

3. The invention set forth in claim 1 wherein each switch set contains a third subgroup of switches containing one switch for each pickup button at said associated station,
   and wherein said logic output providing means includes the provision of the logic outputs of said third group of switches to said memory such that audible ringing signals are provided to selected lines and inhibited from other lines at said associated station in accordance with the obtained logic outputs of said third subgroup of switches.

4. The invention set forth in claim 3 wherein said station control circuit is mounted on a printed wiring board and wherein the printed wiring boards of other station control circuits are mountable in a common frame.

5. The invention set forth in claim 1 wherein the logic outputs provided to said memory associated with said second subgroup of switches are utilized to control special system functions when said associated station is equipped for only single line communication.

6. A station control circuit for use with a multiline pickup button telephone station set and arranged to control telephone communications between said associated telephone station set and a central processor, said processor being arranged to scan said station control circuits of all stations served by said processor, said station control circuit comprising a set of manually operable two-position switches, each switch having a first position for generating a logic 1 output and a second position for generating a logic 0 output, each said switch set divided into subgroups such that a first subgroup of switches contains the number of switches necessary to establish in binary format the logic output equivalent of the highest number of lines served by the processor and a second subgroup of switches contains one switch for each said line by the processor, said logic outputs of said subgroups being adapted such that the binary coded logic output of said first subgroup of switches is operable to establish an association between a predetermined one of said pickup buttons at said associated station set and the line identified by said obtained binary coded logic output, and such that said obtained logic output of said second subgroup of switches is operable to establish which other ones of said lines are associated with other ones of said pickup buttons at said associated station set.

7. The invention set forth in claim 6 wherein each switch set contains a third subgroup of switches containing one switch for each pickup button at said associated station,
   and wherein the logic output of said third group of switches to said processor is such that audible ringing signals are provided to selected lines and inhibited from other lines at said associated station in accordance with the obtained logic outputs of said third subgroup of switches.

8. The invention set forth in claim 7 wherein said station control circuit is mounted on a printed wiring board and wherein the printed wiring boards of other station control circuits are mountable in a common frame.

* * * * *